United States Patent [19]

Sundin

[11] Patent Number: 4,836,320
[45] Date of Patent: Jun. 6, 1989

[54] TURNING APPARATUS FOR HANDLE-OPERATED EQUIPMENT

[76] Inventor: George H. Sundin, 2612 Anderson Rd., Duluth, Minn. 55811

[21] Appl. No.: 148,117

[22] Filed: Jan. 25, 1988

Related U.S. Application Data

[63] Continuation-in-part of Ser. No. 886,118, Jul. 16, 1986, abandoned.

[51] Int. Cl.[4] .............................................. B62B 1/16
[52] U.S. Cl. ................................... 180/19.1; 37/244; 37/270; 280/47.24
[58] Field of Search ...................... 180/6.54, 19.1, 19.2, 180/19.3; 280/47.13 R, 47.17, 47.2, 47.12, 47.24; 15/49 R; 37/244, 270

[56] References Cited

U.S. PATENT DOCUMENTS

| | | | |
|---|---|---|---|
| 1,232,689 | 7/1917 | Johnson | 180/6.54 X |
| 2,124,956 | 7/1938 | Roemer | 280/47.12 |
| 3,145,585 | 8/1964 | Brown | 15/49 R |
| 3,178,838 | 4/1965 | Brown | 180/6.54 X |
| 3,499,659 | 3/1970 | Capadalis | 280/408 X |
| 3,873,118 | 3/1975 | Takagi | 280/47.24 X |
| 3,923,331 | 12/1975 | Hollnagel | 280/47.37 R X |

FOREIGN PATENT DOCUMENTS 412457 1/1926 Fed. Rep. of Germany ..... 180/6.54

Primary Examiner—Charles A. Marmor
Assistant Examiner—Michael Mar
Attorney, Agent, or Firm—Douglas L. Tschida

[57] ABSTRACT

A convex pivoting pad mountable to a snow thrower or other handle-directed, small engine equipment and on to which the equipment weight may be shifted to facilitate turning. In one embodiment, the pad is frame-mounted to the equipment by way of a pedestal assembly. In other embodiments, one or more pads are pivotally mounted in relation to the chassis or lever arms to selectively control the required tilt force relative to the equipment wheels. In a further embodiment, a lever-actuated linkage coupled to the drive axle raises/lowers the pad as the opposite wheel drives the snow thrower therearound.

23 Claims, 3 Drawing Sheets

TURNING APPARATUS FOR HANDLE-OPERATED EQUIPMENT

This is a Continuation-in-Part of application Ser. No. 0/886,118, filed July 16, 1986 now abandoned.

BACKGROUND OF THE INVENTION

The present invention relates to snow throwers and other handle-operated, motorized equipment and, in particular, to apparatus mountable thereto for facilitating turning with a minimum turning radius and operator effort.

With the advent of motorized lawn, garden and snow removal equipment, most outdoor chores have become much less of a burden to the homeowner. Such devices, be it a lawnmower, cultivator or snow thrower, have also proliferated to the point where they are now obtainable in a wide variety of sizes, styles and constructions. These include versions powered to support the operator while providing motive power to the drive wheels or for economical designs, merely supplying power to the drive wheels or, alternatively, relying on the operator to push the unit. Thus, depending upon the normal operating conditions, the weight of the equipment, the numbers of wheels, and the drive train construction, the energy expended by the operator may be suitably controlled—for a price.

Of the these various types of equipment, two of the most commonly found are two-wheeled versions of the snow thrower and garden cultivator. These devices however, even though labor saving, present some difficulty to the operator in those instances where it is necessary to alter the travel direction of the unit. That is, for a snow blower with a direct drive coupling to the wheels, in order to turn the thrower in a reasonably small turn radius, it is necessary for the operator to physically manhandle the unit by tilting the unit rearward and dragging it to one side or the other, before re-leveling the unit and continuing in the altered travel direction. A garden cultivator may similarly be turned, but there the rear end of the unit is typically lifted to free the ground anchor sufficiently to permit the dragging of the unit by its handles to one side or the other. While, overall, the use of either the foregoing devices saves a great deal of energy, they still tax the operator, each time it is necessary to redirect the unit's direction of travel.

Heretofore and for more expensive units, in lieu of the aforementioned lifting, tilting and dragging, expensive reardrive differentials and/or transmissions have been included in various such devices for disengaging drive power to selected wheels to overcome the machine's reluctance to turn. Alternatively, separate braking mechanisms have been applied to the wheels and whereby one or the other of the wheels may be stopped, while providing drive power to the other wheel, with the machine pivoting about the stopped wheel.

As mentioned though, such luxuries are rather costly and not economically feasible for many lower end models of the mentioned devices.

SUMMARY OF THE INVENTION

It is accordingly a principle object of the present invention to provide apparatus for economically facilitating the turning of handle directed motorized lawn, garden and snow removal equipment.

It is a further object of the invention to provide for at least one pedestal mounted, convex or hemi-spherical pivot pad for supporting the equipment equipment during turning.

It is a further object of the invention to provide means for selectively shifting the pivot pad closer or away from the ground to minimize required tilting forces.

It is still another object of the invention to provide means for selectively varying the ground engaging position of the pivot pad relative to the equipment drive wheels.

It is a yet further object of the invention to provide means for controllably applying the motive power to lift the equipment weight off one wheel and onto the pad as the other wheel drives the equipment therearound.

These and other objects are achieved in the presently preferred embodiment of the invention which essentially comprises a support assembly containing a flattened, hemispherical or convex pivot pad mounted rearwardly of the drive wheels and whereby the operator by way of the handles may tilt the equipment rearward to displace a portion of the equipment weight onto the pivot pad and relative to which the equipment may be rotated.

In an alternative embodiment, a hand controlled lever assembly mounted to the operator handles is operable to selectively pivot the hemi-spherical pad into and out of engagement with the ground. The pivot point is thereby displaceable forward or rearward to minimize the necessary tilting forces.

Still another embodiment of the invention comprises a handle mounted control lever pivotally operable relative to a pair of hemi spherical support pads mounted adjacent each of the drive wheels for shifting the equipment weight off one wheel or the other with the non-selected wheel becoming the drive wheel.

In a yet further embodiment of the invention, a handle-operated, flexible linkage is wrapped about the drive axle with controlled pressure inducing the pad to lift the equipment at one wheel as the other wheel drives the equipment therearound. A pressure relief assembly controls the lift height.

The foregoing, objects, advantages and distinctions of the invention as well as others, along with its construction, will become more apparent upon reference to the following description thereof with respect to the appended drawings. Before referring thereto though, it is to be appreciated that the following description is made by way of the presently preferred embodiment only and should not be interpreted in any way to be self-limiting.

BRIEF DESCRIPTION OF THE DRAWINGS

FIG. 5 shows a side elevation view of an embodiment having a pivoting length-adjustable pedestal.

FIG. 6 shows an exploded isometric view of handle-controlled, self-powered lift/pivot embodiment of the invention.

DESCRIPTION OF THE PREFERRED EMBODIMENT

Figure 1:
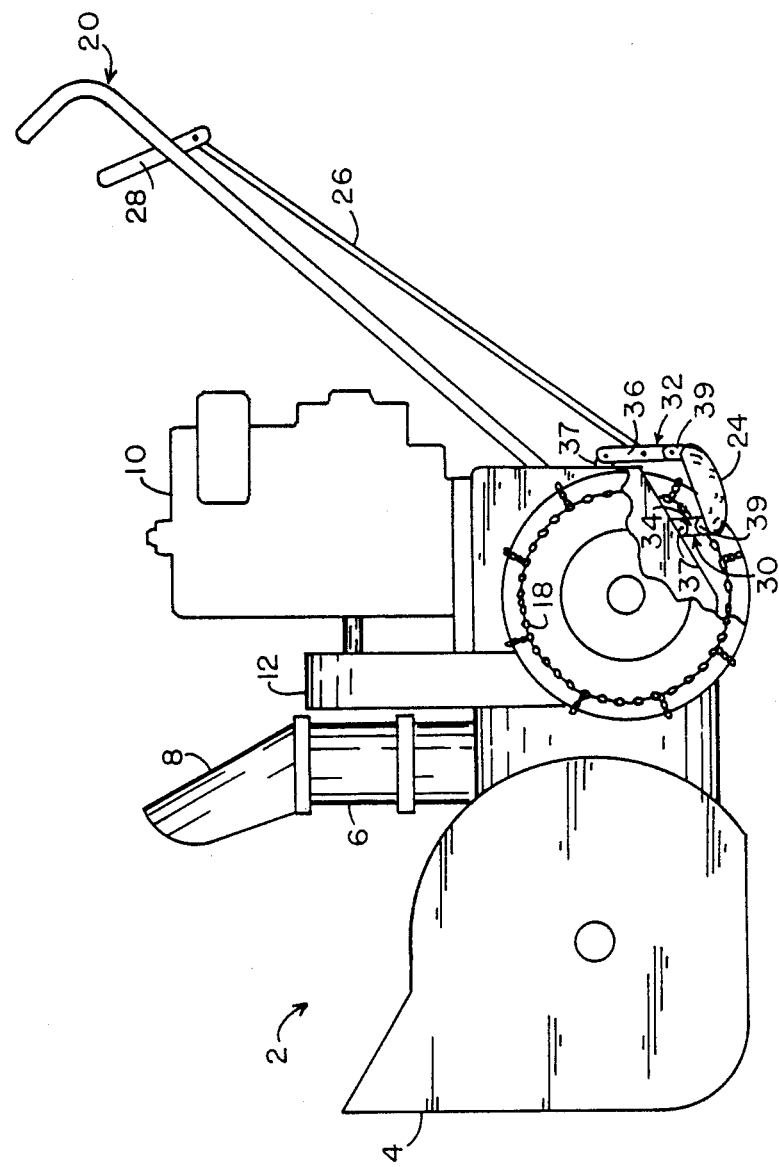
FIG. 1 shows a side elevation view in partial cutaway of the present invention mounted in a lever actuated fashion relative to a snow thrower.

Turning attention to FIG. 1, a side elevation view is shown in partial cutaway of one embodiment of the present invention mounted relative to a conventional large horsepower to stage snow blower 2. The snow blower 2 typically comprises a forward mounted auger containing chute assembly 4, which directs the encountered snow through the tower 6 and outward and away from the assembly 2 by way of the rotatively mounted snout 8. A power plant or small engine 10 of sufficient horsepower and intermediate drive coupling 12 operate the snow gathering auger (not shown), along with the drive train (not shown), to supply motive power to the axle supporting the right and left drive wheels 14 and 16. Snow chains 18 mounted to each of the drive wheels 14 and 16, in turn, enhance traction under typically encountered weather conditions.

Angulating upwardly and rearwardly from the frame of the assembly 2 is a handle assembly 20, comprised of a pair of handles and which support the various controls necessary to operate the snout 8, the engine 10 and the pivot pad of the present invention. The latter feature of which will be described in greater detail hereinafter.

Before addressing the details of the embodiment of FIG. 1, however, it is to be appreciated the typical snow blower drive train assembly is constructed to provide a direct drive to each of the right and left wheels 14, 16. That is, power is applied equally at all times to each of the wheels, regardless of whether they are being driven in their forward or rearward direction. Alternatively, for some units, no drive power is supplied, in which case, the operator must push the unit. Still further and for more expensive assemblies, a drive differential may be provided and which under appropriate circumstances may be engaged to overcome the reluctance of one wheel or the other to turn relative to the other. The relative rotation of one wheel typically being varied in relation to the other, with the unit thereby self-powering itself through a turn. It is to be appreciated though that such assemblies are rather complex and expensive.

For snow throwers 2 of a size using power plants 10 of 5 to 10 horsepower, and able to cut a path of up to three feet in width, it is to be further appreciated that the overall assemblies are rather bulky and of a significant weight. Without the aid of a drive differential, turning the assembly 2 can thus become rather difficult, assuming the operator desires a relatively short turning radium. Most typically therefore and as mentioned for the equipment with which the invention finds application, it is necessary for the operator to tilt the machine while pulling or pushing the handles to one side or the other to induce a pivoting action and thereby redirect the travel direction of thrower 2. Such an effort is however rather burdensome, depending upon the weather conditions and/or the age of the operator.

The present invention was accordingly developed to facilitate this turning operation by providing a mechanical advantage to the operator at relatively little cost and in a fashion which is adaptable to a wide variety of snow throwers and other handled lawn and garden equipment.

Returning attention therefore to FIG. 1 and the cutaway portion through the drive wheel 16, mounted to the frame 22 of the thrower 2 is a flattened, hemi-spherical pivot pad 24. It is operative upon pushing down on the handles 20 and tilting the thrower 2 to displace a portion of the thrower 2's weight on to the pad 24 and whereby the thrower may be more readily turned. That is, for equipment without driven wheels, the weight is concentrated at a relatively small point to permit a freer pivoting action by way of handles. On the other hand, for equipment with driven the wheels, the equipment weight may be shifted slightly to one side or the other of the pad 24 which causes the drive power to the opposite wheel to dominate and turn the equipment. The equipment may thus, with relatively little effort, be caused to pivot about the pad 24 into the desired new direction of travel.

While the pad 24 may be fixedly mounted to the frame 22, and which construction will be described in detail hereinafter with respect to FIG. 2, the embodiment of FIG. 1 is, in contrast, mounted such that by way of the control arm 26 and lever 28, the operator may induce the pad 24 towards or away from the ground surface, thereby controlling the amount of obtained leverage and tilting force required to displace the thrower 2's weight onto the pad 24. That is, by pushing the lever 28 toward the thrower 2, the front and rear linkage 30 and 32 pivot to cause the pad 24 to be drawn upwardly and away from the ground surface. In contrast, by pulling the lever 28 rearward, the control arm 26 induces the linkage arms 32 and 30 to direct the pad 24 towards the ground surface. By then pulling down on the handles 20 in either of these positions, the unit weight is displaced and which given the shape of the pad 24 may be easily re-directed. Lock means (not shown) coupled to the lever 28 also assure that a selected pad position will be maintained. Given therefore typical ground conditions and the unstable footing and other difficulties the operator must overcome while clearing snow, the present invention minimizes the effort of redirecting equipment travel.

While not shown in detail, it is to be appreciated the linkages 30 and 32 are each comprised of a pair of mid-arms 34 and 36 which mount between upper and lower tabs 37 and 39. Hardened link pins pivotally couple each of the arms 34 and 36 to its associated tabs 37 and 39 and permit the mentioned pivoting action.

As presently constructed, the pad 24 is formed in a flattened hemi-spheroid shape. It is fabricated from a suitable metal, which permits the mentioned forming, but could be constructed from a plastic or other molded material. Alternatively, the pad 24 could be cast from aluminum, rubber plastic etc. As presently constructed though, the pad 24 is fabricated from a formed sheet material and to which the tabs 39 are secured before the cupped center is filled with a resin.

Depending too upon the size and weight of the motorized equipment, the amount of surface area engaged by the pad 24 may either be increased or lessened to more of a peg-like construction. Other configurations, besides a spheroid, could also be applied so long as they were supportive of the equipment weight in a stable fashion and allowed the pivoting thereabout.

Figure 3:
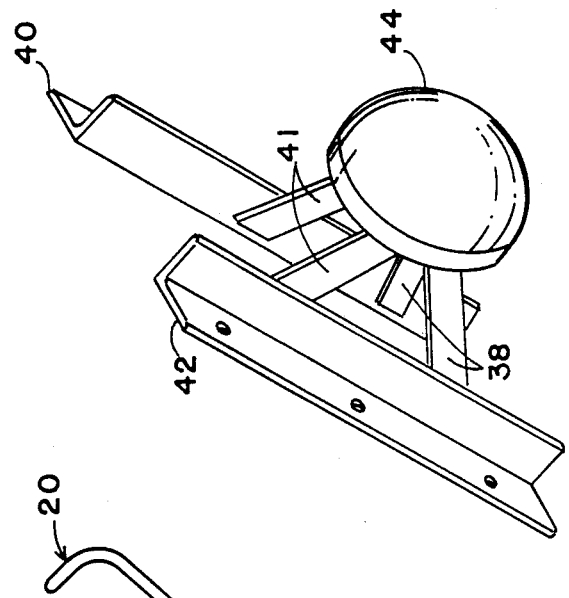
FIG. 3 shows an isometric assembly view of the assembly of FIG. 2.
Figure 2:
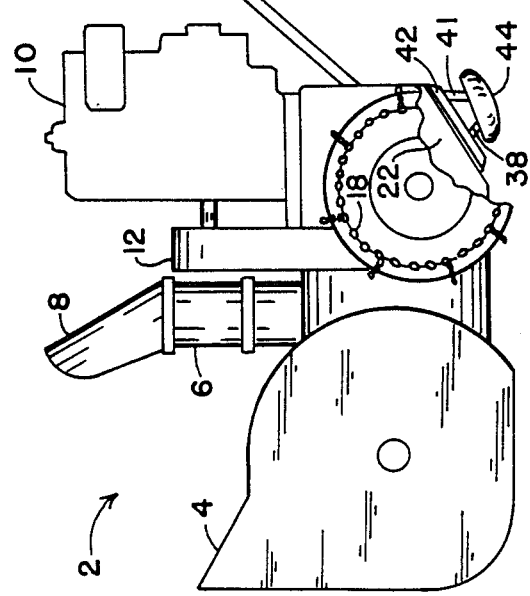
FIG. 2 shows a side elevation view in partial cutaway of a pedestal mounted pivot pad assembly.

Directing attention next to FIGS. 2 and 3, respective side elevation and isometric views are shown of a pedestal-like embodiment of the invention which is fixedly mounted to the frame 22. This assembly is particularly constructed of right and left channel members 40 and 42 which are boltably secured to the undercarriage of the frame 22 at an upwardly angulating portion thereof. Extending downwardly to the pad 44 are four support members, the forward two 38 of which are slightly shorter than a rearwardly mounted pair 41. Mounted, in turn, within the pad 44 are tabs (not shown) which are weldably secured thereto and to which the arms 38 and 41 are secured. The pad 44 is thereafter filled with the mentioned resin, concrete or the like.

In use, however, and to be distinguished from the embodiment of FIG. 1, the assembly of FIGS. 2 and 3 acts as a fixed pedestal and requires a slightly greater tilt action at the handle assembly 20, before the equipment's weight is shifted onto the pad 44. Given though a relatively deep snow, this may be advantageous, in that the chute 4 is thereby raised higher and less snow is engaged by the sides of the chute 4 as the thrower 2 is turned.

Figure 4:
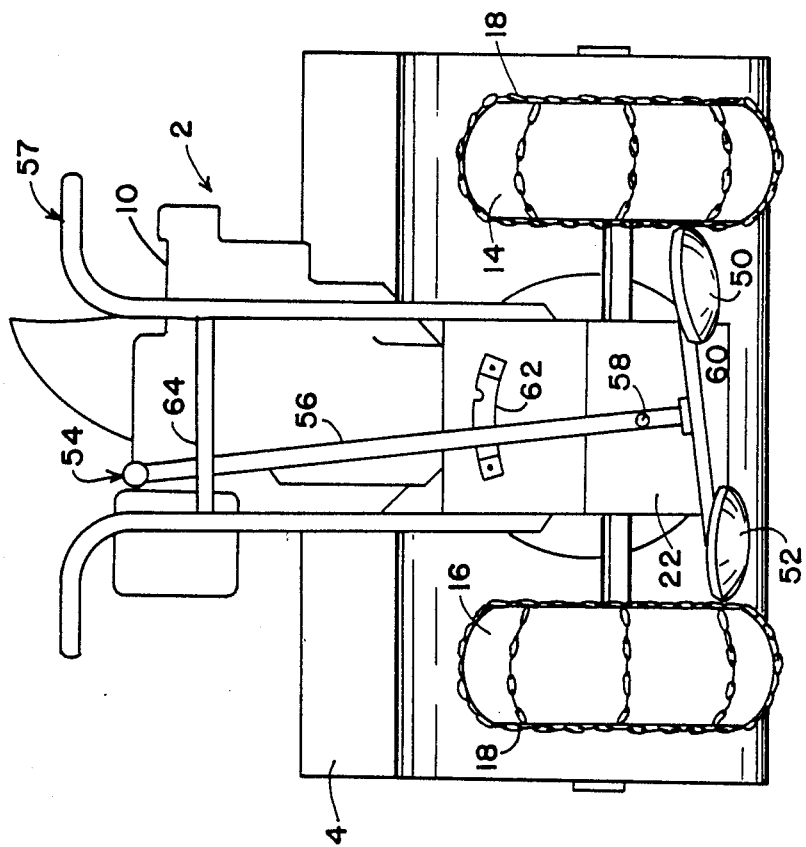
FIG. 4 shows a rear elevation view of an alternative embodiment of the invention including a pair of lever actuated pivot pads.

While the embodiments of FIGS. 1 through 3 are directed to embodiments with single pivot pads 24 and 44, it is to be appreciated that multitple pads might be included; for example, in the fashion of the embodiment of FIG. 4. There, two pads 50 and 52 are provided which are of a generally similar construction to the pads 24 and 44, although they are mounted via a separate control arm assembly 54, such that one or the other of the pads 50, 52 may be selectively brought into engagement with the ground, adjacent either the right or left wheel 14, 16. The tilting force is thus reduced, in the fashion of the embodiment of FIG. 1. At the same time, the snow thrower 2 is also lifted to one side, thereby disengaging drive power to that wheel, while the other wheel continues to drive and rotate the thrower 2 about the ground engaged pad 50, 52. In essence, therefore, a drive differential effect is achieved.

The control assembly 54 for achieving the above-mentioned operation comprises a handled control arm 56 mounted between a handle pair assembly 57 and which arm 56 pivots relative to the frame 22 at a fixed pivot point 58. A lateral control arm 60, attached to the lower end of the arm 56, supports each of the pads 50, 52 thereto.

A lock member 62 secured to the frame 22 (as shown) or alternatively to the upper cross brace 64 between the handles, locks the control arm 56 to one side or the other. Thus, upon setting the control assembly to one side or the other and pushing back on the handle assembly 57, the thrower 2's weight is displaced onto the selected pad 50, 52, while the non-selected drive wheel 14, 16 causes the thrower to rotate thereabout.

While too the assembly of FIG. 4 is shown in relation to a fixed pivot point 58, it is to be appreciated that like the embodiment of FIG. 1, the pivot point 58 might also be raised and lowered by way of a separate control arm mechanism like that of FIG. 1 and which, in turn, would reduce the tilting force required by the operator to initiate the turning of the thrower.

In the latter regard, FIG. 5 shows an embodiment of the invention wherein a T-shaped, single pedestal rod 65 is used to support a pad 66. In particular, the rod 65 comprises a length of rod stock. The upper end of the rod 65 includes a 90-degree bend 67 and the extreme end of which includes a welded cross piece 68, the outer ends of which, in turn, pivotally mount to a pivot bracket 69 secured to the back of the snowthrower chassis. The lower end of the rod 65 includes threads 70 which mount to a mating threaded fastener at the pad 66. The length of the exposed rod may be adjusted by controlling the mounting depth of the rod threads 70 to the pad 66, which length may be fixed via a lock nut secured to the rod 65 above the top of the pad 66.

In normal use, the rod 65 pivots freely in a pendulum fashion about the bracket with the weight of the pad causing the pad to seek a plumb position and whereat the pad may not physically contact the chassis. Upon tilting the thrower backward, however, reference the phantom line view, and as snowthrower weight is transferred onto the pad 66, the upper bend 67 of the rod is brought into locked engagement with the back of the chassis. Depending upon the length established for the rod, the point of contact of the pad 66 with the ground and amount of required tilt is adjustable.

Directing still further attention to FIG. 6, an exploded isometric view is shown of a self-powered lifting/pivoting assembly 71. That is, the assembly 71 via drive power from the drive axle 72, which is shown without either of the wheels 14, 16, operates to raise/lower the pad 74 which in turn raises/lowers the thrower 2 at a selected one of the wheels 14, 16. The opposite wheel powers the thrower around the pad 74, until the pad 74 is raised and the selected wheel lowered back to the ground, once the desired direction of travel is attained.

The aforementioned operation is particularly attained via the drive linkage which generally comprises a pivotally mounted pad support arm 76, a pivotally mounted chain support arm 78, a flexible chain linkage 80, a handlemounted lever 81 and a pressure relief plate 82. The support arm 76 comprises a length of angle iron which is mounted to the thrower chassis at a pivot bolt 84 and extends outwardly therefrom to position the pad 74 in proximity to one of the wheels. A spring 77 biases the arm 76 and pad 74 away from ground contact. The pad 74 is fixedly secured to one end of a vertical control arm 86 which, in turn, is welded to the arm 76. The relief plate 82 is secured to the upper end of the arm 86. Thus, as the arm 76 pivots, the plate 82 and pad 74 rise and fall in unison therewith.

Mounted to the pressure relief plate 82 is one end of the flexible chain linkage 80 which in the present embodiment comprises a length of chain. The chain 80 passes from a suitable coupler at the plate 82 and is wrapped about the drive axle 72 two or more turns, or as required, to provide frictional engagement therewith, before being directed about a roller 88 mounted to the arm 78 which pivots about the thrower chassis at a pivot pin 90. A cable portion 89 coupled to the chain 80 is thereafter directed along the chassis in a non-constricting fashion as it extends to the handle-mounted lever 81. Although a chain/cable linkage is shown, it is to be appreciated either a chain or a cable by themselves or a drive belt or a belt/pulley linkage or a combination thereof can be used so long as a flexible linkage is attained which will sufficiently grasp the axle 72 without damaging either and transfer power therefrom.

Specifically, the linkage 80, 89 transfers power upon the operator's squeezing of the lever 81 which, in response, tightens the chain 80 about the axle 72 which produces a winching action that causes the control arm 86 and relief plate 82 to be drawn down and the pad 74 to contact the ground and lift the thrower 2. Depending upon the pre-set length of travel, the relief plate 82, as it is lowered, strikes the upper side of the support arm 78 which is spring-biased upward via a leaf spring 94 extending from the chassis to pivot down and about the pivot 90. In so doing, pressure is released from the linkage 80 to the point where it slips on the axle 72, yet maintains the raised condition of the thrower 2. In the meantime, the opposite wheel continues to turn and rotate the thrower about the pad 74. Once the desired rotation has been achieved, the lever 81 is released and the spring loading from springs 77 and 94 on the arms 76 and 78 returns the arms to their rest positions.

Although described for one wheel only, it is to be appreciated that the foregoing assembly could be applied to each of the wheels 14, 16 and/or in combination with one of the manual embodiments of FIGS. 1 or 3. A thrower 2 thus configured would be readily turnable without undue operator effort. Moreover, in lieu of a hemi-spheroid pad 74, the latter embodiment might use a flat ground contacting member to displace greater weight and raise a portion of the chute 4, to minimize the dragging of snow as the chute 4 is turned.

While the invention has been described with respect to a snow thrower, as mentioned, it is to be appreciated that it might equally be applied to a number of other powered lawn and garden tools. Accordingly, it is contemplated that the above-described invention should be interpreted so as to include all those equivalent embodiments within the spirit and scope of the following claims.

What is claimed is:

1. Turning apparatus for handle directed equipment including first and second axially aligned primary support wheels steerable via at least one handle, comprising:
   (a) a first relatively large surfaced convex ground engageable pad; and
   (b) means for securing said pad in extended relation from a surface of said equipment relative to said handle and offset from the axis of said wheels, such that upon tilting the equipment by said handle, the equipment's weight is displaceable off at least one of said wheels onto said pad whereby the equipment may be pivoted about a substantially fixed pivot axis located at the point of contact between the pad and the ground to re-direct equipment travel.

2. Apparatus as set forth in claim 1 including a pad supporting framework comprised of a plurality of rigid supports mounted to the equipment frame.

3. Apparatus as set forth in claim 1 including means for selectively varying the position of said pad relative to said equipment wheels and the ground.

4. Apparatus as set forth in claim 1 wherein said equipment includes:
   (a) means for driving said first and second primary support wheels;
   (b) a second relatively large surfaced convex ground engaging pad; and
   (c) means for selectively varying the position of one of said first and second pads relative to one of said first and second wheels, such that upon tilting the equipment onto one of said pads, one of said wheels is substantially disengaged from the ground and the other wheel drives said equipment about the pad in contact with the ground.

5. Apparatus as set forth in claim 1 including:
   (a) means pivotally mounting said pad to the equipment;
   (b) a lever coupled to said pad; and
   (c) means for locking said pad at a selected position.

6. Apparatus as set forth in claim 1 including means for selectively retracting and extending said pad from the frame.

7. Apparatus as set forth in claim 1 wherein said pad comprises a spheroid member.

8. Apparatus as set forth in claim 7 wherein said pad is of a hemi-spheroid construction.

9. Apparatus as set forth in claim 2 wherein said framework comprises a pair of channel members mounted to the equipment frame in spaced-apart parallel relation to one another and includes a plurality of rigid supports mounted between said channel members and said pad.

10. Auxiliary turning apparatus for handle directed, wheeled snow thrower equipment including first and second axially aligned primary support wheels steerable via at least one handle, comprising:
   (a) a relatively large surfaced spheroid ground engageable pad; and
   (b) a framework including a plurality of rigid support members, ones of which members mount to and support said pad in extended relation from the equipment relative to the handle and offset from the axis of said wheels such that upon tilting the equipment by said handle, the equipment weight is displaced off one of said wheels and onto said pad and the other of said wheels whereby the equipment may be pivoted about a substantially fixed pivot axis located at the point of contact between said pad and the ground.

11. Turning apparatus for handle directed equipment including first and second axially aligned primary support wheels steerable via at least one handle member, comprising:
   (a) a first relatively large surfaced convex ground engageable pad; and
   (b) means for pivotally mounting and selectively extending said pad from a surface of said equipment relative to said handle and offset from the axis of said wheels, such that upon extending said pad from at least one predetermined position and tilting the equipment by said handle, the equipment's weight is displaceable off at least one of said wheels and onto said pad and whereby the equipment may be pivoted about a substantially fixed pivot axis located at the point of contact between the pad and the ground to re-direct equipment travel.

12. Apparatus as set forth in claim 11 including means for locking said pad at a selected position.

13. Turning apparatus for handle directed equipment including first and second axially aligned primary support wheels steerable via at least one handle member, comprising:
   (a) first and second convex relatively large surfaced ground engageable pads; and
   (b) means for pivotally mounting and selectively positioning said first and second pads from a surface of said equipment relative to said handle and offset from the axis of said wheels, such that upon tilting the equipment by said handle, the equipment's weight is displaceable off at least one of said wheels and onto one of said pads whereby the equipment may be pivoted about a substantially fixed pivot axis located at the point of contact between the pad and the ground to re-direct equipment travel.

14. Apparatus as set forth in claim 13 including means for locking a selected pad at a selected position.

15. Apparatus as set forth in claim 1 wherein said securing means comprises a rod member having an upper end pivotally mounted to said equipment and a lower length adjustable end secured to said pad.

16. Apparatus as set forth in claim 11 wherein the upper end of said rod includes a cross member pivotally supported from said equipment and is bent such that upon displacing the equipment weight onto the pad, the rod restrainedly contacts the equipment in the region of the bend.

17. Turning apparatus for handle directed wheeled equipment having first and second axially aligned support wheels comprising:
 (a) an internal combustion engine;
 (b) means coupled to said engine for simultaneously rotating said support wheels to drive said apparatus over the ground;
 (c) a pad mounted to said equipment; and
 (d) means coupled to said engine for selectively extending said pad into ground engaging contact to raise at least one of said support wheels from ground contact such that the other ground engaging support wheel drives said equipment about a substantially fixed pivot axis formed at the point of contact between the pad and the ground, to vary the direction of apparatus travel, said point of contact being located in the ground area defined substantially between the boundaries of said support wheels when projected onto the ground.

18. Apparatus as set forth in claim 17 including:
 (a) a pad support framework pivotally coupling the pad to the equipment;
 (b) means coupled to said support framework and an axle supplying drive power to said support wheels for raising/lowering said pad; and
 (c) means for disconnecting power from said raising/lowering means when said equipment is raised a predetermined height.

19. Apparatus as set forth in claim 18 wherein said raising/lowering means comprises:
 (a) a hand lever; and
 (b) a flexible linkage mounted to said lever and trained about said powered axle to selectively compressively transfer power to said pad support framework.

20. Apparatus as set forth in claim 19 wherein said pad support framework includes an offset member and said framework includes a pivotal linkage support arm such that said offset member pivots said linkage support arm as said pad is powered to control the compressive pressure applied to said axle.

21. Turning apparatus for handle directed wheeled equipment including first and second axially aligned power driven support wheels comprising:
 (a) a ground engageable pad;
 (b) a first support framework pivotally coupling said pad to the equipment;
 (c) a hand lever;
 (d) a flexible linkage coupled to said lever and compressively trained about a powered axle for providing power to pivot said pad support framework to raise at least one of said support wheels from ground contact, after said pad is in ground engaging contact;
 (e) an offset member extending from said first framework and coupled to said flexible linkage; and
 (f) a second support arm coupled to said flexible linkage such that said offset member pivots said second support arm as said pad is lowered into ground engaging contact to disconnect said linkage from said axle after said equipment has been raised to a predetermined height.

22. Turning apparatus for equipment including a pair of coaxially mounted support wheels and at least one of which support wheels is power driven comprising:
 (a) a ground engageable pad mounted to said equipment; and
 (b) means coupled to an equipment power source for selectively extending said pad into ground-contacting engagement to raise at least one of said support wheels from ground contact such that a ground engaging power driven support wheel drives said equipment about a substantially fixed pivot axis formed at a point of contact between the pad and the ground, to vary the direction of apparatus travel, said point of contact being located in the ground area defined substantially between the boundaries of said support wheels.

23. Turning apparatus for handle directed wheeled equipment comprising:
 (a) a power source;
 (b) means coupled to said power source and to an axle supporting first and second support wheels for driving said apparatus over the ground;
 (c) a pad mounted to said equipment; and
 (d) means coupled to said axle for providing power to selectively extend said pad into ground-contacting engagement to raise at least one of said support wheels from ground contact and such that the other ground engaging support wheel drives said equipment about a substantially fixed pivot axis formed at the point of contact between the pad and the ground to vary the direction of apparatus travel, said point of contact being located in the ground area defined by the boundaries of said support wheels.

* * * * *